United States Patent [19]

Rialan

[11] Patent Number: 4,905,205

[45] Date of Patent: Feb. 27, 1990

[54] METHOD FOR TRANSMITTING TO A CENTRAL RECORDING DEVICE SEISMIC DATA COLLECTED BY ACQUISITION APPARATUS DISTRIBUTED OVER THE GROUND AND A DEVICE FOR IMPLEMENTING SAME

[75] Inventor: Joseph Rialan, Meudon, France

[73] Assignee: Institut Francais du Petrole, Rueil Malmaison, France

[21] Appl. No.: 137,336

[22] Filed: Dec. 23, 1987

[30] Foreign Application Priority Data

Dec. 23, 1986 [FR] France ............................. 86 18030

[51] Int. Cl.⁴ ..................... G01V 1/22; H04M 11/10
[52] U.S. Cl. ................................ 367/77; 340/870.28; 369/29
[58] Field of Search ................ 367/76, 77, 21, 78, 367/79; 346/33 C; 364/421; 340/870.28; 455/601, 603; 369/29

[56] References Cited

U.S. PATENT DOCUMENTS

| | | | |
|---|---|---|---|
| 3,934,202 | 1/1976 | Missale | 455/50 |
| 3,996,554 | 12/1976 | Ives et al. | 340/901 |
| 4,387,452 | 6/1983 | Bricot et al. | 369/199 |
| 4,390,974 | 6/1983 | Siems | 367/76 |
| 4,463,354 | 7/1984 | Sears | 340/870.02 |
| 4,493,063 | 1/1985 | Tims et al. | 367/77 |
| 4,583,206 | 4/1986 | Rialan et al. | 367/78 |
| 4,616,320 | 10/1986 | Kerr et al. | 364/421 |
| 4,663,743 | 5/1987 | Rampuria et al. | 364/421 |
| 4,663,744 | 5/1987 | Russell et al. | 367/76 |
| 4,725,992 | 2/1988 | McNatt et al. | 367/77 |

FOREIGN PATENT DOCUMENTS 2055467 1/1977 United Kingdom.

Primary Examiner—Thomas H. Tarcza
Assistant Examiner—Ian J. Lobo
Attorney, Agent, or Firm—Antonelli, Terry & Wands

[57] ABSTRACT

A method is provided for the transfer to a central recording device of data corresponding to signals received by a set of seismic sensors which have been sampled, digitized and stored by a plurality of data acquisition apparatus and a device for implementing same, said process including the storage of data in static memories disposed in each of said apparatus, at the end of each recording session moving to the vicinity of each of them a mass memory associated with the device for transferring the collected data into this mass store over a high flow rate connection (cable, wide band short wave link, modulated light beams etc.) and the direct transfer of the data from the mass store to the recording device, a relatively narrow band radio link providing the direct transfer of recording or test data between the apparatus and the central recording system.

12 Claims, 1 Drawing Sheet

METHOD FOR TRANSMITTING TO A CENTRAL RECORDING DEVICE SEISMIC DATA COLLECTED BY ACQUISITION APPARATUS DISTRIBUTED OVER THE GROUND AND A DEVICE FOR IMPLEMENTING SAME

BACKGROUND OF THE INVENTION

1. Field of the Invention

The invention relates to a method of transmitting, to a central recording system, seismic data collected by data acquisition devices spread out in a zone to be prospected, and the device for implementing same.

Modern seismic prospection methods include the use of data devices spaced apart at regular intervals over a distance sometimes of several kilometers. They are each adapted for collecting seismic signals picked up by one or more appropriate receivers (hydrophones or geophones) in response to the vibrations transmitted into the ground by a seismic source and reflected back by the discontinuities of the subsoil. The signals which they collect are sampled, digitized and stored in a memory before transmission thereof in real or delayed time to a central control and recording laboratory.

The different acquisition devices may be connected to the central control and recording laboratory by common cables adapted for transmitting both control and test signals and the accumulated seismic data. The different acquisition devices are interrogated in sequence by the central laboratory and in response transmit thereto the stored digital data.

2. Description of the Prior Art

Such a system is described for example in the U.S. Pat. No. 4 398 271.

The different acquisition devices may be connected to the central laboratory by a short wave link. Each of them is then associated with radio equipment. The collected data may be transmitted to the central laboratory in real time and simultaneously for all the acquisition devices. This requires the use and therefore the availability of a large number of wide or narrow band short wave transmission channels of different frequencies.

Transmission of the data collected by the acquisition devices may also be made sequentially, each of them transmitting in turn its own data either directly to the central laboratory or through other intermediate acquisition devices or relay elements. Recording means are then used for storing the collected data for the time required for their sequential transfer to the central Short wave link seismic data transmission systems are described for example in the U.S. Pat. No. 4 583 206 or French Patent No. 2 538 561.

Delayed transmission systems are also known in particular from the U.S. Pat. No. 3 946 357 and the European patent No. EP 10 660, in which the collected seismic data are stored in cassette recorders contained in the different acquisition apparatus. At the end of each recording session in the field or at regular intervals, the field team replaces all the recording cassettes and brings back the recorded cassettes to the central laboratory where their contents are transferred to a high capacity recording apparatus. When a short wave link is available between each acquisition device and the central laboratory, this latter may order in turn reading of the cassettes of all the recorders and the transfer of the data which they contain to the central recording apparatus.

The prior transmission systems mentioned have drawbacks related not only to the method of connection to the central laboratory but also the type of recorder available in each acquisition device. In fact, seismic prospection operations are often conducted in zones where the local regulations relating to the use of transmission channels involves troublesome restrictions. The transmission of seismic data, when it is made by short wave link, requires one or more wide band transmission channels which it is sometimes difficult to obtain.

The use of a recorder in each acquisition device makes it possible to avoid permanent if not total recourse to short wave links in the case of delayed transmission and so facilitates the preparation of a firing run. But in this case, the advantages are lost which are brought by a permanent control.

Since cassette recorders are not always of a very high reliability, the staff of the central laboratory cannot check whether their operation is correct or detect a possible failure.

Tests are sometimes conducted before the beginning of each recording session on a seismic profile, from the central laboratory and by short wave link, to check the correct operation of the recorders. But these tests are often very long because of the number of acquisition apparatus to interrogate, and cannot be carried out systematically. The field staff may then remain unaware of the possible failures of recorders and more generally of the acquisition apparatus, and that sometimes leads to an important loss of seismic data.

Since cassette recorders are relatively slow, the transfer of seismic data to the central recorder often takes a considerable time. This is true if the transfer takes place by short wave link from each of the acquisition devices. That is also the case when the storage cassettes, once recorded, are brought back to the central laboratory and read one after the other.

SUMMARY OF THE INVENTION

The method and device of the invention avoids the above mentioned drawbacks.

The method applies to the transfer to a central device of data recordings corresponding to signals received by a set of seismic sensors spaced apart along a seismic profile to be prospected, in response to vibrations transmitted and reflected back by discontinuities in the subsoil, during successive transmission-reception cycles, these signals being collected by a plurality of acquisition apparatus adapted for sampling digitizing and storing the signals received.

It includes the storage, in each acquisition apparatus on a high speed access and extended capacity storage means, of data collected during the same seismic exploration session formed of a given number of transmission-reception cycles, the displacement to the vicinity of each of the acquisition apparatus successively of a high speed mass storage device, the transfer thereto successively of the data stored by each of the acquisition apparatus over a single short range high speed data flow connection, and the transfer of all the data stored in the mass storage device to the central recording device.

The transfer of data from each of the acquisition apparatus to the mass storage device may be effected by a short range high speed data flow/transmission cable. The data flow may also be achieved by means of a short range, wide band short wave link or else by means of a modulated light beam.

The method of the invention may also comprise, for checking purposes, the transfer to the central recording device of a part of the data collected by each of the acquisition apparatus successively, over a short wave transmission link with relatively narrow pass band.

The method of the invention may also include the transfer of limited data representing the result of tests of the correct operation of each acquisition apparatus and of the quality of the seismic acquisition, in the normal interval between the successive transmission-reception cycles.

The high speed access memory is preferably formed by an integrated circuit memory of the EEPROM or RAM type. A memory of this type has numerous advantages. It is reliable. Its very short access time facilitates the management of the data stored as well as the transfer thereof. Its low electric consumption is suitable for independent acquisition apparatus supplied with power by accumulators. Being of a high capacity, it may store all the data collected during the same seismic exploration session. A memory of this type is particularly well adapted in addition to facilitate test operations on the stored data. The partial seismic data to be transmitted directly to the central recording device for control purposes or else that which is to be processed for elaborating test data to be transmitted, may be readily read out at will from the RAM at any moment during the recording cycles and transferred to the radio transmission-reception means at a rate adapted to the possible transfer rate of the radio channel used.

The combined use of a high capacity and high flow rate mass memory makes it possible to facilitate and accelerate, at the end of the session, the collection of the data stored by the different acquisition apparatus and restoral of their storage capacity for a subsequent recording session.

The operation is further accelerated if a high flow rate transmission system is used such as a modulated light beam or wide band radio wave transceiver, possibly a transmission cable or else a magnetic connection through the case of the acquisition apparatus. It should be emphasized that the short range required for the radio transfer because the mass memory is located close to each acquisition box, makes possible the use of wide band radio transmission means of very low power which do not require particular permission from the administrative bodies.

BRIEF DESCRIPTION OF THE DRAWINGS

Other features and advantages will be clear from reading the following description of an embodiment given by way of non limitative example, with reference to the accompanying drawings in which.

DESCRIPTION OF THE PREFERRED EMBODIMENT

The device of the invention is adapted for transferring to a central recording laboratory seismic signals picked up by seismic receivers disposed along a seismic profile to be explored and collected by seismic data acquisition apparatus adapted for amplifying, digitizing and storing the signals. The same acquisition apparatus may connect the signals coming either from a single receiver or from several receivers. In this case, the different signals are collected by multiplexing and sampling as is well known. These acquisition apparatus are contained in sealed boxes possibly associated with buoys when they are placed on flooded ground.

Figure 1:
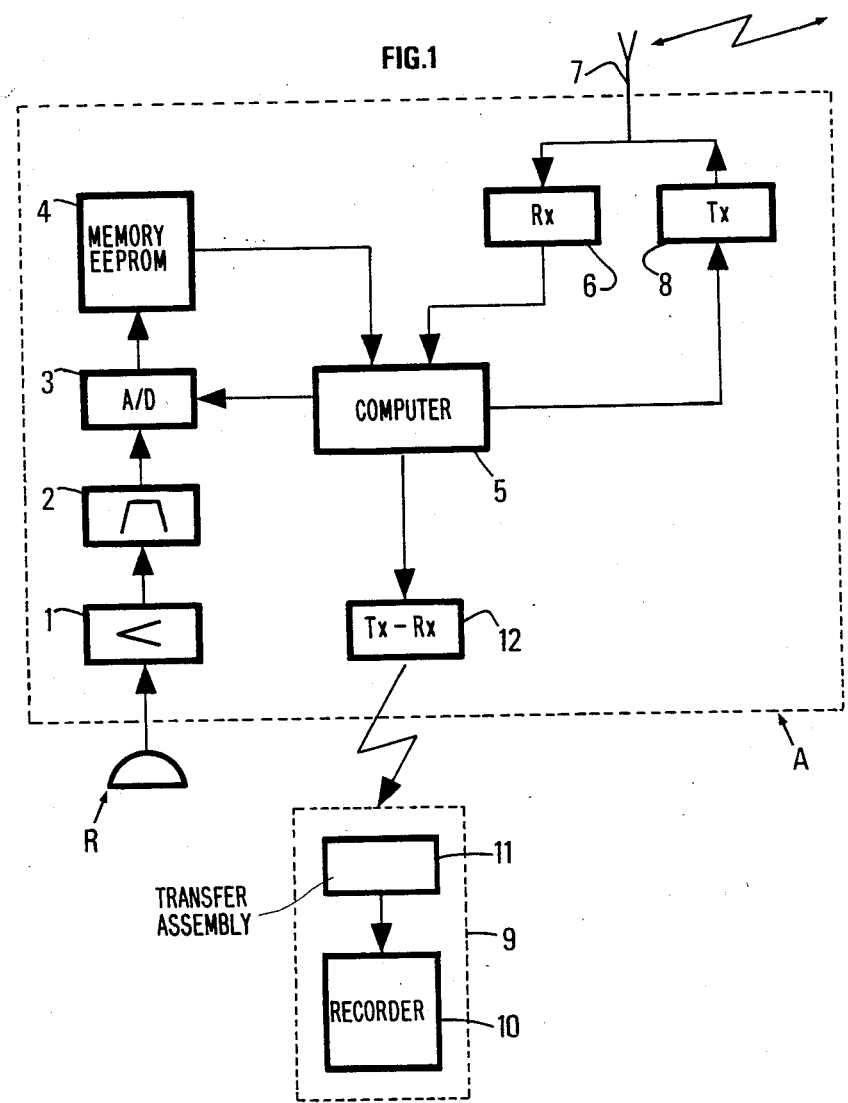
FIG. 1 shows the block diagram of one embodiment of a seismic acquisition box for putting into practice the method of the invention and a storage system for collecting the data.

The acquisition apparatus A as shown in FIG. 1 by way of example includes a single input channel to which a seismic receiver R is connected. The receiver is connected to an input of an acquisition chain comprising, connected in series, an amplifier 1, filtering means 2 for selecting a useful frequency band and an analog-digital converter 3. The digitized signals delivered by the converter are fed into a memory 4.

A static memory may for example be used of a known high capacity type (EEPROM). This memory is formed by associating integrated circuits in number sufficient so that all the signals received during the same seismic exploration session may be stored. The capacity of integrated circuit memory elements does not cease to increase. At the present time of a few hundred kilobits, it should soon reach several megabits even ten to twenty megabits. As has already been mentioned, this type of memory is both reliable, rapid, energy saving and occupies a small volume.

A programmable computer 5 is connected to the memory 4 and to the analog-digital converter 3. It is adapted to manage the conversion of the signals into digital words, the transfer thereof into memory 4 and subsequent rereading thereof. Computer 5 is connected to a long range radio wave receiver 6 adapted for demodulating control or interrogation signals coming from the central laboratory and picked up by an antenna 7. To this same antenna is connected a long range radio wave transmitter 8 which receives from computer 5 the responses to be transmitted to the central laboratory in response to the control or interrogation signals received over the two-way long range radio transmitter.

The signals exchange between each acquisition apparatus and the central laboratory may be of a smaller or greater amount depending on the case.

In the case where the central laboratory exercises no check on the operation of the acquisition apparatus during a data acquisition session, the signals exchanged are formed essentially by the initialization signals at the time of tripping of the seismic source (TB) and by different acquisition signals retransmitted on reception of the signals.

In the case where it is desired to check the correct operation of each acquisition apparatus during each acquisition session, the time interval between two successive "firings" may be used or longer momentary interruptions for ordering a transfer to the central laboratory of checking data or possibly, wholly or partially, the seismic data collected during any "firing". This transfer is made over one or more standard narrow transmission band short wave channels whose authorization for use is easier to obtain from governmental authorities than for very wide band channels often necessary in seismic prospection.

By restricting the information retransmitted by each acquisition apparatus in response to the interrogation signals coming from the central laboratory on the long range bi-directional narrow transmission band radio, to a limited number of parameters, it may be arranged to interrogate them all during the time interval between two successive transmission-reception sequences. These parameters may be one or more values of the signal to noise ratio or of the mean energy of the stored seismic signals, digital words coding the operating quality of the electronics of the acquisition apparatus, of the radio equipment or else the temperature or humidity inside the box etc.

A reception system comprising 600 successively interrogated acquisition apparatus will be considered by way of example. If each of them retransmits 120 bytes representing the values of different operating parameters, their responses may be very readily transmitted during the time interval of a few seconds separating two consecutive "firings", by using four or five standard short wave channels.

In some cases when it is desired to know more precisely the quality of the data acquisition the succession of transmission-reception cycles may be interrupted momentarily, or any interruption may be used occuring during an exploration session and the data collected may be transferred during a "firing", by all the acquisition apparatus, to the central laboratory. This latter successively interrogates the different acquisition apparatus.

The computer 5 inside each apparatus, on receiving a transfer order, orders the transfer to the radio transmitter 8 of the data read out from the static memory 4 and relative to the particular transmission-reception cycle.

By way of example, the transfer of the data relative to the same firing, over a standard short wave channel having a transmission capacity of 6000 bits/second, takes less than 15 seconds. If four different short wave channels for example are available, a little more than ten minutes is sufficient for transferring to the laboratory the data collected by 200 acquisition apparatus during the same transmission-reception cycle.

After each recording session, the static memory 4 of each acquisition apparatus contains several tens of M bits.

By way of example, if the data volume corresponding to the same firing is of the order of 80 000 bits, after a session including 400 successive transmission-reception cycles, the data volume will be of the order of 64 Mbits.

Figure 2:
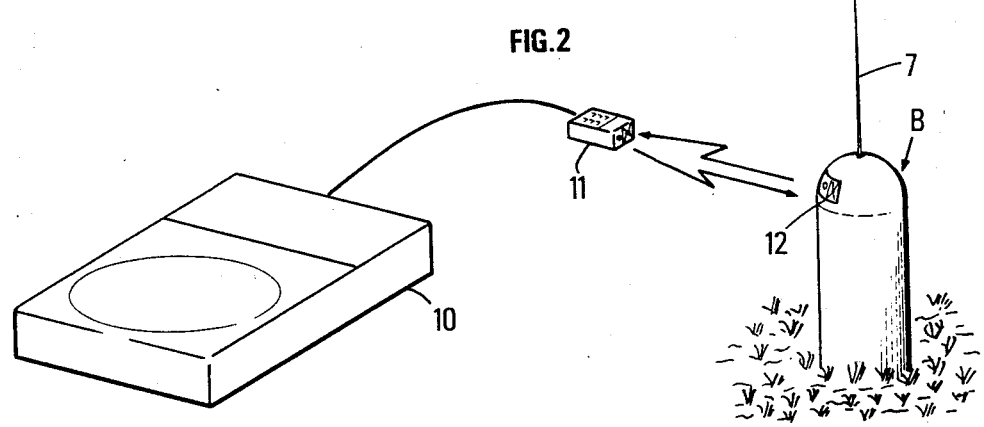
FIG. 2 shows a movable mass memory system for collecting in the field the data accumulated by each of the acquisition boxes.

At the end of each seismic exploration session, the stored data is then collected. A high speed short range data flow transmission and recording system 9 is moved (FIG. 2) successively to t vicinity of all the apparatus (by means of any vehicle adapted to the site, a boat for example if the acquisition boxes are installed on flooded ground).

The recording system 9 includes for example a digital optical disk recorder 10 associated with a transfer assembly 11 comprising a modulated light ray transceiver driven by a control member. A short range data flow transmission means or transfer assembly that is used may for example be similar to the one described in the French patent application No. EN 86/11 876. The acquisition apparatus then also comprises a light ray transceiver 12 driven by the computer 5.

The optical transmission means may be replaced in the transfer assembly 11, 12 by a wide band radio transceiver whose transmission power is sufficiently low for it to be used without special permission. A 1 GHz transceiver whose power is limited to 1OOmW is suitable for example for this application. Magnetic transmission between transceivers disposed in the transfer assembly and the acquisition apparatus may further be achieved through the wall of the box thereof.

The preceding embodiments are particularly suitable for the case where the acquisition boxes are used in a humid zone.

But the transmissions may be made however using a physical connection by means of a wide band transmission cable which will be connected to an appropriate socket on the acquisition box B.

With such wide band transmission channels whose flow rate is of several Mbits/sec., the entire contents of each static memory 4 may be transferred in a few seconds to the recording system 9. If for example a digital optical disk system is used capable of acquiring data at a speed of 4Mbit/sec, 8 secs. is sufficient for transferring the 64 Mbits which, as we have seen, a static acquisition apparatus memory may contain, at the end of each recording session.

The portable recording system 9 having successively collected the data accumulated by the assembly of the acquisition apparatus, is brought back to the central laboratory and its contents transferred to a mass memory and processed for obtaining seismic recordings.

What is claimed is:

1. A method for transferring to a central control and recording assembly data corresponding to signals received by a set of seismic sensors spaced apart along a seismic profile to be prospected that is remote from said central control and recording assembly, in response to vibrations transmitted and reflected back by discontinuities in the subsoil, during successive transmission-reception cycles, these signals being collected by a plurality of acquisition apparatus adapted for sampling, digitizing and storing the signals received, said method including the steps of:

providing each acquisition apparatus with a short range data flow transmission means and a narrow transmission band radio transmission and reception means for bidirectional communications with said central control and recording assembly;

storing in an electronic random access memory seismic data collected during a seismic recording session formed of a given number of seismic transmission-reception cycles;

transmitting data indicative of correct operation of each said acquisition apparatus directly by said narrow transmission band radio transmission means to said central control and recording assembly during an interval between successive transmission-reception cycles of a seismic recording session;

transporting a high speed mass storage device to the vicinity of each said acquisition apparatus successively at the end of said seismic exploration session;

transferring to said mass storage device from individual ones of said acquisition apparatus successively the seismic data stored by each said acquisition apparatus over a single data flow connection at a high data flow rate; and thereafter transmitting all the data collected in the mass storage device to the central control and recording assembly.

2. A method for transferring to a central control and recording assembly data corresponding to signals received by a set of seismic sensors spaced apart along a seismic profile to be prospected, in response to vibrations transmitted and reflected back by discontinuities in the subsoil, during successive transmission-reception cycles, these signals being collected by a plurality of acquisition apparatus adapted for sampling, digitizing and storing the signals received, said method including the steps of:

providing each acquisition apparatus with a short range data flow transmission means and a narrow transmission band radio transmission and reception means for bidirectional communications with said central control and recording assembly;

storing in each said acquisition apparatus on a high speed electronic memory means of extended capacity, seismic data collected during a seismic recording session formed of a given number of transmission-reception cycles;

transmitting by said narrow transmission band radio transmission means to said central control and recording assembly during the course of said seismic exploration session and for checking purpose of selected seismic data indicative of correct acquisition operation at each said acquisition apparatus;

transporting a high speed mass storage device to the vicinity of each said acquisition apparatus successively at the end of said seismic exploration session;

transferring to said mass storage device successively from individual ones of said acquisition apparatus data stored by each said acquisition apparatus over a single data flow connection at a high data flow rate; and thereafter transmitting all the data collected in the mass storage device to the central control and recording assembly.

3. A method as claimed in claim 2 comprising a selective reading of said high speed electronic memory means to pick up therein only a part of the seismic data collected respectively by each said acquisition apparatus by said narrow band radio transmission link to said central control and recording assembly.

4. A method as claimed in claim 2 comprising selective reading of all the data collected during a single transmission reception cycle on said high speed electronic memory means, said narrow band radio transmission having a narrow pass band which is inadequate for quality transmission of the total seismic transmission data and being operative to sequentially transfer said data from said acquisition apparatus to said control and recording assembly during interruptions of said seismic recording session.

5. A method as claimed in claim 2 comprising selective reading of limited data representing results of tests indicating correct operation of each acquisition apparatus and good quality of the seismic acquisition from said high speed electronic memory means, said narrow band radio transmission being operative to transfer said limited data during a normal interval between the successive transmission-reception cycles.

6. A method as claimed in any one of claims 2-5 comprising transferring of stored data from each said acquisition apparatus to the mass storage device by a high data flow rate transmission cable.

7. The method as claimed in any one of claims 2-5 comprising transferring of stored data from each said acquisition apparatus successively to said mass storage device by a short range, wide pass band, short wave link.

8. A method for transferring to a central control and recording assembly data corresponding to signals received by a set of seismic sensors spaced apart along a seismic profile to be prospected, in response to vibrations transmitted and reflected back by discontinuities in the subsoil, during successive transmission-reception cycles, these signals being collected by a plurality of acquisition apparatus adapted for sampling, digitizing and storing the signals received, said method including the steps of:

storing in each said acquisition apparatus on a high speed electronic memory means of extended capacity, seismic data collected during a seismic recording session formed of a given number of transmission-reception cycles;

transmitting by radio to said central control and recording assembly during the course of said seismic exploration session and for checking purpose of data indicative of correct operation of each said acquisition apparatus;

transporting a high speed optical disk mass storage device to the vicinity of each said acquisition apparatus successively at the end of said seismic exploration session;

transferring to said mass storage device successively from individual ones of said acquisition apparatus data stored by each said acquisition apparatus over a single data flow connection at a high data flow rate by a modulated light beam containing no optical fibers; and thereafter transmitting all the data collected in the mass storage device to the central control and recording assembly.

9. A device for transferring to a central control and recording assembly seismic data corresponding to signals received by a set of seismic sensors spread out along a seismic profile to be prospected that is remote from said central control and recording assembly, in response to vibrations transmitted into and reflected back by the discontinuities in the subsoil, during successive transmission-reception cycles, of a seismic exploration session, said device including:

a plurality of acquisition apparatus spread out on a field near said seismic profile and adapted for sampling, digitizing and storing seismic signals that are received;

each said acquisition apparatus comprising a radio wave receiver, a high speed electronic memory means for storing the seismic data collected during an exploration session, and a control and synchronizing assembly for effecting transmission by a narrow transmission band radio to said central control and recording assembly during the course of said seismic exploration session of data indicative of correct operation of each said acquisition apparatus; and a high speed mass storage device movable successively to the vicinity of each of said acquisition apparatus on the field and having associated therewith a short range, high rate of data transmission means for collecting in seriatim the seismic data stored in each of said electronic memory means.

10. The device as claimed in claim 9 wherein the electronic memory means is a random access memory unit and the short range, high rate of data transmission means includes a low power, wide frequency band radio receiver movable to be associated with each acquisition apparatus and with the mass storage device.

11. A device for transferring to a central control and recording assembly seismic data corresponding to signals received by a set of seismic sensors spread out along a seismic profile to be prospected that is remote from said central control and recording assembly, in response to vibrations transmitted into and reflected back by the discontinuities in the subsoil, during successive transmission-reception cycles, of a seismic exploration session, said device including:

a plurality of acquisition apparatus spread out on a field near said seismic profile and adapted for sampling, digitizing and storing seismic signals that are received;

each said acquisition apparatus comprising a radio wave receiver, a high speed electronic random access memory means for storing the seismic data collected during an exploration session, and a control and synchronizing assembly for effecting transmission by radio to said central control and recording assembly during the course of said seismic exploration session of data indicative of correct operation of each said acquisition apparatus; and a high speed mass storage device including a digital optical disk recorder that is movable successively to the vicinity of each of said acquisition apparatus on the field and having associated therewith a short range, high rate of data transmission means for collecting in seriatim the seismic data stored in each of said electronic memory means.

12. The device as claimed in claim 11 wherein the short range, high rate of data transmission means includes light ray receivers, means for modulating the light rays as a function of the data to be transmitted and means for detecting modulations affecting the transmitted light rays.

* * * * *